Aug. 10, 1965

L. A. TOTH 3,199,328

MILL SCREW THRUST BEARING ASSEMBLY

Filed April 6, 1962

LEO A. TOTH
*INVENTOR*

BY *Mason, Porter, Diller & Stewart*

ATTORNEYS

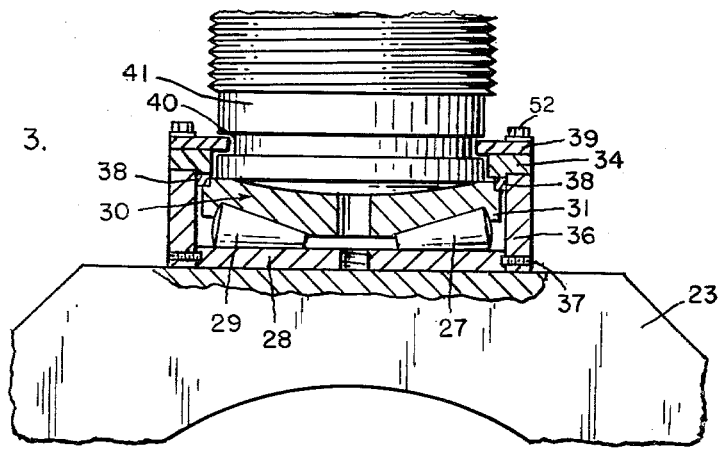

3,199,328
MILL SCREW THRUST BEARING ASSEMBLY
Leo A. Toth, South Bend, Ind., assignor to The Torrington Company, Bantam Bearings Division, South Bend, Ind., a corporation of Maine
Filed Apr. 6, 1962, Ser. No. 185,578
8 Claims. (Cl. 72—248)

The following specification relates to an improved antifriction thrust bearing for rolling mills. With current practice of high speed rolling of metal billets, plates and strips, the spacing of the work rollers requires constant adjustment in small and precise amounts. Such accurate adjustment when accomplished by mill screws, requires a minimum of friction with the greatest response to the adjustment.

While anti-friction thrust bearings have been suggested for this purpose, they are subject to limitations in view of the necessity to provide lateral adjustment between the mill screws and the associated parts.

It is an object of this invention to provide a conical roller thrust bearing with spherical seat of increased sensitivity and freedom for lateral or radial adjustment of the bearing members relative to the mill screws.

It is a further object of the invention to eliminate the need for an intermediate bearing block between the upper race member and the screw.

It is a further object of my invention to provide an accurate and sensitive adjustment between the hold-down screw and the antifriction bearings used.

A further object of my invention is to provide a compact bearing cartridge which may be previously assembled and secured as a unit.

As illustrating the invention and by way of example, the preferred forms of the invention are shown on the accompanying drawings in which:

FIGURE 3 is an enlarged vertical section of a modified form of the invention and FIGURE 4 is an enlarged side elevation partly in vertical section, of the improved bearing in a different mounting.

Figure 1:
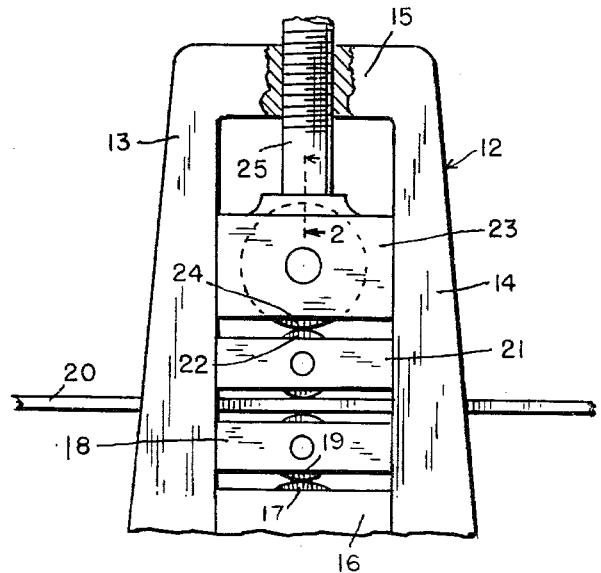
FIGURE 1 is a front elevation, partly in section, of the upper portion of a 4-high rolling mill equipped with the novel thrust bearing.

While the invention has been shown for purposes of illustration in connection with a 4-high rolling mill, it may apply to a two-high mill as well. The mill frame is built up of two opposite pedestals 12. The sides 13 and 14 of these pedestals form parallel guides for the chocks of the mill rollers.

The upper parts of the frames are tied in by means of a bridge member 15.

The 4-high mill comprises bottom chocks 16 which form journal bearings for the back-up roller 17. A second pair of chocks 18 is mounted between the side guide members 13, 14 above the chocks 16. Chocks 18 form journals for the lower work roll 19.

This roll supports the plate or strip 20 which is being flattened and its thickness reduced in the rolling mill.

The guides also carry a pair of chocks 21 above the strip 20. These chocks form journals for the upper work roll 22.

A second pair of chocks 23 above chocks 21, form journals for the back-up roll 24.

Mill screws 25, threaded through the frame members 15 are provided with spherical ends 26. These ends bear down as shown diagrammatically in FIGURE 2 on the bearing race 30.

Figure 2:
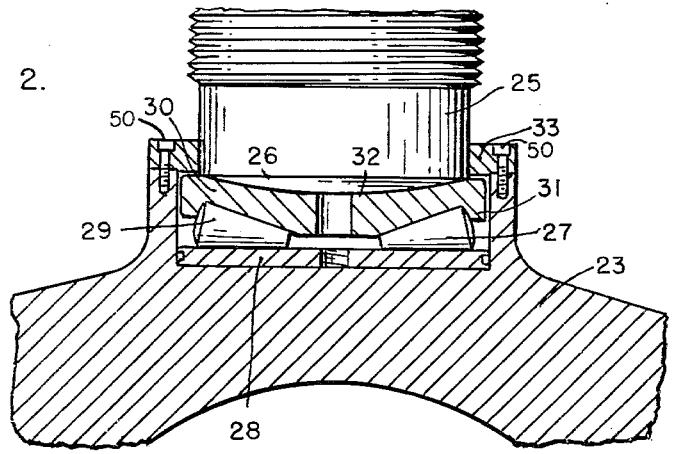
FIGURE 2 is an enlarged vertical section taken on the line 2—2 of FIGURE 1.

The general relationship between the upper chock 23 and the antifriction thrust bearing is shown in more detail in FIGURE 2. Here there is a race member or plate 28 having flat surfaces on the top and bottom. A series or full complement of conical bearing rollers 29 rest on the lower raceway 28.

The upper raceway 30 has a lower conical surface which conforms to the slope required to rest upon the rollers 29. The upper raceway has a peripheral flange 31 against which the outer ends of the rollers 29 ride and by which they are confined.

The upper surface of the race member 30 is concave or part-spherical as shown at 32. This serves to support the correspondingly convex end 26 of the hold-down screw.

A cover ring 33 defines means for surrounding and guiding the mill screw 25. The covering 33 is bolted on the chock 23 by removable securing means or bolts 50 disposed around the screw 25 and above the upper race member 30.

The bearing unit may be made a captive of the mill screw. This is shown in FIGURE 3, where the mill screw 41 has a peripheral groove 40.

Means in the form of a cartridge or shell 36 surrounds the race members 28 and 30, and partially defines a chamber 51 housing the race members 28, 30 and the rollers 29. A filler member or packing 38 seals the upper edge of the collar 36 from the corresponding recessed periphery of the upper race member 30. Set screws 37 hold the lower race member 28.

A sectional cover ring 39 defines means surrounding the mill screw 31 the ring 39 is bolted to the collar 34 by removable securing means or bolts 52 and extends inwardly, where it is received in groove 40 on the outer surface of the screw 41.

The bearing unit may be made independent of the chock 23 and guided by the side members 13 and 14. This form is shown on FIGURE 4. There the side members have vertical guide rails 42, 42.

A housing 43 takes the place of the collar around the bearing. This housing has diametrically extending bars 44, 44, terminating in shoes 45, 45 slidable on the rails 42, 42. The center of the housing 43 is in the form of a collar 46 partially defining a chamber 53. The lower raceway 28 fits within collar 46 and is held in place by set screws 37. The raceway 28 rests slidably on the upper surface of chock 23.

This collar 46 encloses the upper raceway 30 and the rollers 29 in the manner above described. The upper bearing member 30 is free to adjust itself laterally with the mill screw 41, while the lower raceway member 28 is held rigidly with the collar 46.

The mill screw 41 may be withdrawn upwardly, in which case it carries the bearing unit with it, the latter being vertically slidable on the shoes 42, 42.

There is also a slidable adjustment possible between the lower race member 28 and the flat top of the chock 23.

As shown above in detail, provision has been made to supply antifriction thrust bearings between the mill screws of a rolling mill and the upper back-up chocks. This allows for initial misalignment and sensitive and precise adjustment of pressure in extremely small increments.

While I have shown and described the preferred forms of the invention, it will be evident that minor changes in structural details, material and proportions are possible within the scope of the following claims.

What I claim is:

1. A screw-down thrust bearing comprising in combination with a mill screw having a threaded portion and an unthreaded end portion, a flat first race member having a race surface in a plane normal to the mill screw axis, a second race member, means at least partially defining a chamber for housing said first and second race members, said second race member having a generally frusto-conical race surface directed radially inward and inclined relative to the mill screw axis, a plurality of tapered rollers between the race surfaces of said first and second race members, one of said race members having means for confining said rollers against radial outward movement under the influence of axial loads imposed thereon by said mill screw, said rollers each having an axis in parallel relationship to said frusto-conical race surface, means surrounding the unthreaded end portion of said mill screw, means for removably securing said last mentioned means to said first mentioned means, said surrounding means defining an opening smaller than the largest dimension of said upper race member normal to said mill screw axis whereby said surrounding means both confines said race members in said chamber and prevents removal therefrom without first manipulating said securing means, one of said first and second race member and mill screw end portions having surfaces in bearing engagement in said chamber, and said surfaces in bearing engagement with each other being concavo-convex in configuration.

2. The screw-down thrust bearing as defined in claim 1 wherein said unthreaded end portion of said mill screw is freely axially movable relative to said surrounding means.

3. A screw-down thrust bearing comprising in combination with a mill screw, a lower race member, an upper race member, a plurality of anti-friction elements between said members and means for coupling together at least one of said race members and said mill screw whereupon movement of said mill screw imparts movement to said at least one race member.

4. A screw-down thrust bearing comprising in combination with a mill screw having a convex lower face, a flat lower race member, an upper race member having a conical lower face, a full complement of tapered rollers between said members, said screw and said upper race member together forming a concavo-convex bearing and means for coupling together the lower race member and the mill screw.

5. A rolling mill comprising a stand having parallel vertical pedestals, guides on the pedestals, a mill-screw on the stand having a convex lower face, a housing slidably guided on said guides, means for suspending the housing from the mill screw and an antifriction bearing in the housing opposite the screw, said bearing having upper and lower race members and a full complement of intervening conical rollers, the screw and upper race member of the bearing having complementary concavo-convex surfaces.

6. A rolling mill comprising a stand having parallel vertical pedestals, guides on the pedestals, a mill screw on the stand having a convex lower face and a peripheral groove, a housing slidably held on said guides, a ring on the housing and seated in the said groove, a flat lower race member attached to the housing, a full complement of conical bearing rollers on the race member, and an upper race member having a conical lower face and a concave upper surface complementary to the end of the mill screw.

7. A screw-down thrust bearing comprising in combination with a mill screw having a peripheral groove and a convex end surface, a shell, a ring on the shell and seated in the said groove, a flat lower race member held by the shell, an upper race member in the shell, said upper race member having a conical lower face and a concave upper surface complementary to the end of the mill screw and a full complement of tapered rollers between said race members.

8. A screw-down thrust bearing comprising in combination with a mill screw having a peripheral groove and a convex end surface, a shell, a ring on the shell and seated in the said groove, a flat lower race member held by the shell, an upper race member in the shell, said upper race member having a conical lower face and a concave upper surface complementary to the end of the mill screw, a peripheral flange on the upper race member, and a full complement of tapered rollers on the lower race member within said flange.

References Cited by the Examiner

UNITED STATES PATENTS

| | | | |
|---|---|---|---|
| 529,853 | 11/94 | Burdick | 308—231 |
| 563,720 | 7/96 | Rook | 308—230 |
| 1,084,107 | 1/14 | Pisarcik | 80—56 |
| 1,383,372 | 7/21 | Baum | 308—230 |
| 1,594,420 | 8/26 | Lochhead et al. | |
| 1,782,969 | 11/30 | Klein. | |
| 1,832,649 | 11/31 | Orelind. | |
| 2,161,768 | 6/39 | Smitmans. | |
| 2,451,683 | 10/48 | Mantle | 308—227 XR |
| 2,905,964 | 9/59 | Hull | 308—231 XR |
| 2,959,458 | 11/60 | Kaye | 308—231 |
| 3,055,243 | 9/62 | Cauley et al. | 80—57 |
| 3,132,547 | 5/64 | Doyle et al. | 80—57 |

CHARLES W. LANHAM, *Primary Examiner.*

ROBERT C. RIORDON, *Examiner.*